UNITED STATES PATENT OFFICE.

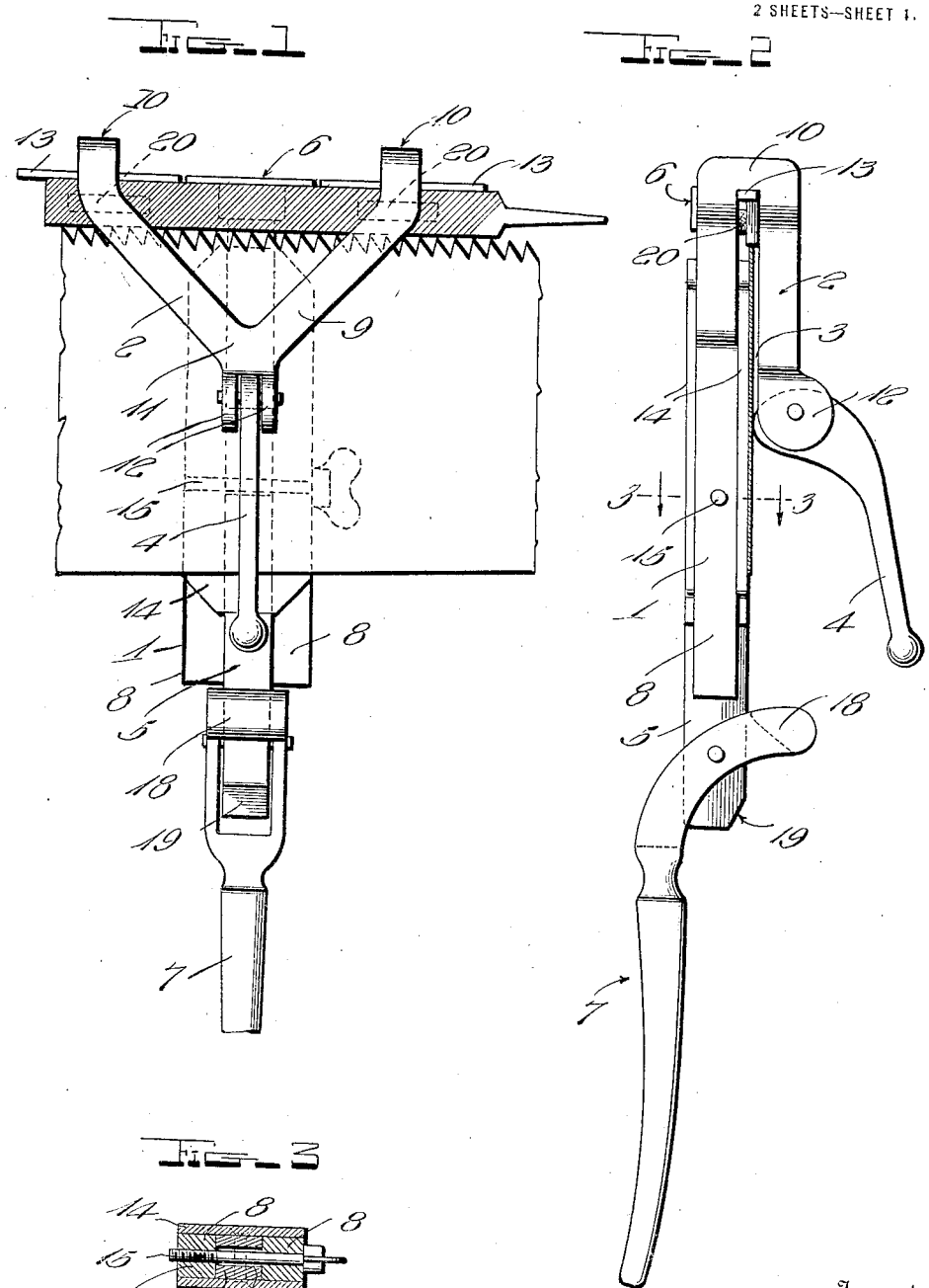

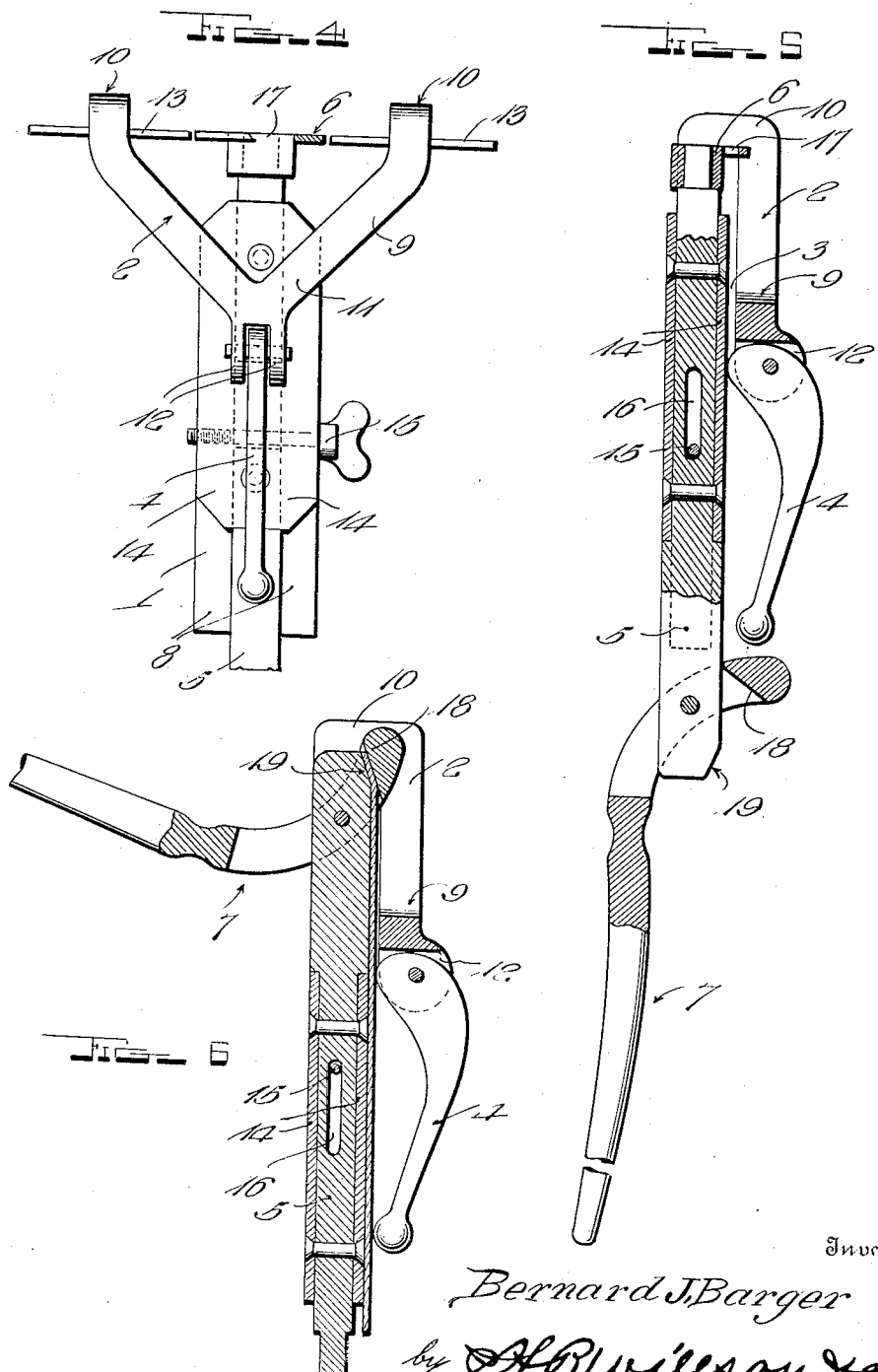

BERNARD J. BARGER, OF EL PASO, TEXAS.

SAW GAGING AND SETTING TOOL.

1,328,554.   Specification of Letters Patent.   Patented Jan. 20, 1920.

Application filed May 1, 1919. Serial No. 293,925.

*To all whom it may concern:*

Be it known that I, BERNARD J. BARGER, a citizen of the United States, residing at El Paso, in the county of El Paso and State of Texas, have invented certain new and useful Improvements in Saw Gaging and Setting Tools; and I do declare the following to be a full, clear, and exact description of the invention, such as will enable others skilled in the art to which it appertains to make and use the same.

My invention has for its principal object to provide a comparatively simple and inexpensive, yet a highly efficient and reliable tool for both gaging and setting saws and for truing the teeth thereof should this be required.

A further object is to provide a reversible bar carrying the saw gaging means on one end and the saw setting means on the other end, in such a manner that either of said means may be brought into play when required.

With the foregoing in view, the invention resides in the novel construction and arrangement of parts hereinafter fully described and claimed, the descriptive matter being supplemented by the accompanying drawings.

Figure 1 is a plan view of the tool in use for truing saw teeth.

Fig. 2 is an edge view.

Fig. 3 is a detail transverse section on the plane of line 3—3 of Fig. 2.

Fig. 4 is a plan view of the device set up for gaging saw teeth.

Fig. 5 is a side elevation with parts in section.

Fig. 6 is a central longitudinal section illustrating the manner in which the saw setting means is used.

In the drawings above briefly described, the numeral 1 designates a shank having a forked head 2 at its front end, said head being provided with an open throat 3 extending through both of its furcations to receive a saw. The rear end of the head 2 carries a cam lever 4 or other suitable saw clamping device. A bar 5 is carried by and slidable longitudinally of the shank 1, one end of said bar carrying saw gaging means 6 while the other end thereof is provided with saw setting means 7.

The shank 1 is divided longitudinally into two spaced parallel halves 8 which are preferably formed of rectangular stock, the front ends of said halves diverging at 9, being turned substantially upon themselves at 10, converging rearwardly at 11, and having their rear ends joined and provided with ears 12 to carry the lever 4. The portions 9 and 11 are spaced apart to provide the throat 3 and the front end of this throat is provided with a pair of transverse plates 13 for contact with the saw teeth, one plate being carried by each furcation of the head 2.

The bar 5 is slidably received between the two halves 8 of the shank 1 and is provided with guideways slidably engaging said halves, said guideways being preferably formed by the projecting edges of plates 14 which are secured to the upper and lower sides of the bar. It will be understood, however, that this exact construction is not essential and furthermore that the shank 1 and its forked head 2 could be formed in numerous ways other than that shown. In most instances, any suitable means such as a set screw 15 passing through a slot 16 in the bar 5, will be provided for holding the bar and shank in relatively adjusted positions.

The saw gaging means 6 may be of any adequate form, but preferably consists of a vertical plate rising from one end of the bar 5 and provided with a slot 17 to receive the saw teeth. Similarly, the setting means 7 might well be of any adequate construction but I prefer to provide a lever having a loop-shaped end 18 straddling the bar 5 and fulcrumed thereto for coöperation with a bevel 19 with which said bar is provided. By removing the set screw 15 and the lever or the like 7, the bar 5 may slide from the shank 1 and it will thus be seen that said bar may be reversed to position either the saw setting means or the saw gaging means between the furcations of the head 2.

Fig. 1 discloses a file secured by wedges 20 in the front end of the throat 3 for truing the ends of the saw teeth when required; Fig. 4 illustrates the device in position for gaging the saw teeth; and Fig. 6 discloses the bar 5 in a reversed position for setting the teeth of the saw. The device will be highly efficient for any of these uses, and since probably the best results may be obtained from the details disclosed, they may well be followed. I wish it understood, however, that within the scope of the invention as claimed, numerous minor changes may well be made.

I claim:—

1. In a tool of the class described, a shank provided at one end with a forked head having a throat extending through both of its furcations to receive a saw blade, a saw clamping device carried by said head, a bar carried by and slidable longitudinally of said shank, saw gaging means on one end of said bar, and saw setting means on the other end thereof, said bar being reversible for positioning either of said means between the furcations of said forked head.

2. In a tool of the class described, a shank divided longitudinally into two spaced halves, a forked head on one end of said shank having an open throat extending through both of its furcations to receive a saw blade, a saw clamping device carried by said head, a longitudinal bar positioned slidably between said halves of said shank, and having guideways receiving said halves, saw gaging means on one end of said bar and saw setting means on the other end thereof, said bar being reversible for positioning either of said means between the furcations of said forked head.

3. In a tool of the class described, a shank formed of two parallel, spaced halves diverging at their front ends, then turned substantially upon themselves and converging rearwardly, and joined to each other at the rear ends of said converging portions, a saw clamping device carried by said joined ends, a bar slidable between said shank halves and having guideways receiving them, saw gaging means on one end of said bar, and saw setting means on the other end thereof, said bar being reversible for positioning either of said means between the furcations of said forked head.

4. In a tool of the class described, a shank provided at one end with a forked head having a throat extending through both of its furcations to receive a saw blade, a saw clamping device carried by said head, a bar carried by and slidable longitudinally of said shank, to position one of its ends between the furcations of said head, and means on said bar end for performing work upon the saw.

5. In a tool of the class described, a shank divided longitudinally into two spaced halves, a forked head on one end of said shank having an open throat extending through both of its furcations to receive a saw blade, a saw clamping device carried by said head, a longitudinal bar positioned slidably between said halves of said shank, and having guideways receiving said halves, one end of said bar being receivable between the furcations of said head, and means on said bar end for performing work upon the saw.

6. In a tool of the class described, a shank formed of two parallel, spaced halves diverging at their front ends, then turned substantially upon themselves and converging rearwardly and joined to each other at the rear ends of said converging portions, a saw clamping device carried by said joined ends, a bar slidable between said shank halves and having guideways receiving them, one end of said bar being receivable between said diverging ends of said shank halves, and means on said bar end for performing work upon the saw.

In testimony whereof I have hereunto set my hand.

BERNARD J. BARGER.